(12) United States Patent
DiMascio et al.

(10) Patent No.: US 11,421,331 B2
(45) Date of Patent: Aug. 23, 2022

(54) EXTRACTION OF CARBON DIOXIDE AND HYDROGEN FROM SEAWATER AND HYDROCARBON PRODUCTION THEREFROM

(71) Applicant: The Government of the United States of America, as represented by the Secretary of the Navy, Arlington, VA (US)

(72) Inventors: Felice DiMascio, Rock Hill, CT (US); Dennis R. Hardy, California, MD (US); M. Kathleen Lewis, Lake Ariel, PA (US); Heather D. Willauer, Fairfax Station, VA (US); Frederick Williams, Accokeek, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 495 days.

(21) Appl. No.: 15/089,728

(22) Filed: Apr. 4, 2016

(65) Prior Publication Data
US 2016/0215403 A1 Jul. 28, 2016

Related U.S. Application Data

(62) Division of application No. 13/838,074, filed on Mar. 15, 2013, now Pat. No. 9,303,323.

(51) Int. Cl.
*C25B 15/02* (2021.01)
*C25B 1/10* (2006.01)
(Continued)

(52) U.S. Cl.
CPC ............... *C25B 9/23* (2021.01); *C01B 32/50* (2017.08); *C10G 2/50* (2013.01); *C25B 1/04* (2013.01);
(Continued)

(58) Field of Classification Search
CPC ................................... C25B 9/08; C25B 1/10
See application file for complete search history.

(56) References Cited

U.S. PATENT DOCUMENTS

| | | | | |
|---|---|---|---|---|
| 5,264,089 A | * | 11/1993 | Kaczur | B01J 19/2475 205/349 |
| 5,900,127 A | * | 5/1999 | Iida | C02F 1/46109 204/290.08 |
| 7,392,848 B1 | * | 7/2008 | Bader | B01D 61/025 166/371 |
| 2002/0134687 A1 | * | 9/2002 | Nakajima | A61L 2/186 205/466 |

(Continued)

OTHER PUBLICATIONS

Hardy et al., "Recovery of [CO2]T from Aqueous Bicarbonate using a Gas Permeable Membrane," Memorandum Report NRL/MR/6180-08-9129, Naval Research Laboratory, Jun. 25, 2008.*

*Primary Examiner* — Salil Jain
(74) *Attorney, Agent, or Firm* — US Naval Research Laboratory; Rebecca L. Forman

(57) ABSTRACT

Apparatus for seawater acidification including an ion exchange, cathode and anode electrode compartments and cation-permeable membranes that separate the electrode compartments from the ion exchange compartment. Means is provided for feeding seawater through the ion exchange compartment and for feeding a dissociable liquid media through the anode and cathode electrode compartments. A cathode is located in the cathode electrode compartment and an anode is located in the anode electrode compartment and a means for application of current to the cathode and anode is provided. A method for the acidification of seawater by subjecting the seawater to an ion exchange reaction to exchange $H^+$ ions for $Na^+$ ions. Carbon dioxide may be extracted from the acidified seawater. Optionally, the ion exchange reaction can be conducted under conditions which produce hydrogen as well as carbon dioxide. The carbon dioxide and hydrogen may be used to produce hydrocarbons.

8 Claims, 8 Drawing Sheets

(51) Int. Cl.
*C25B 9/10* (2006.01)
*C25B 9/23* (2021.01)
*C10G 2/00* (2006.01)
*C01B 32/50* (2017.01)
*C25B 9/19* (2021.01)
*C25B 9/73* (2021.01)
*C25B 1/04* (2021.01)
*C25B 15/08* (2006.01)

(52) U.S. Cl.
CPC .................. *C25B 9/19* (2021.01); *C25B 9/73* (2021.01); *C25B 15/02* (2013.01); *C25B 15/08* (2013.01); *C10G 2300/42* (2013.01); *C10G 2400/08* (2013.01); *Y02E 60/36* (2013.01); *Y02W 10/37* (2015.05)

(56) References Cited

U.S. PATENT DOCUMENTS

| | | | | |
|---|---|---|---|---|
| 2005/0079121 A1* | 4/2005 | DiMascio | ................. | C25B 1/22 |
| | | | | 423/477 |
| 2005/0232833 A1* | 10/2005 | Hardy | ..................... | C01B 3/042 |
| | | | | 422/617 |
| 2007/0045125 A1* | 3/2007 | Hartvigsen | ............... | C25B 1/00 |
| | | | | 205/637 |
| 2007/0187262 A1* | 8/2007 | Field | ....................... | A47L 11/03 |
| | | | | 205/742 |
| 2009/0307975 A1* | 12/2009 | Wolf | ..................... | B01D 53/62 |
| | | | | 48/197 R |
| 2010/0187128 A1* | 7/2010 | Neubert | .................. | B01D 1/22 |
| | | | | 205/743 |

* cited by examiner

EXTRACTION OF CARBON DIOXIDE AND HYDROGEN FROM SEAWATER AND HYDROCARBON PRODUCTION THEREFROM

This application is a divisional application of U.S. application Ser. No. 13/838,074 filed on Mar. 15, 2013, which claimed priority to, and the benefit of, U.S. Provisional Application No. 61/333,553 filed on May 11, 2010, as well as U.S. application Ser. No. 12/958,963 filed on Dec. 2, 2010. The entireties of each of these applications are herein incorporated by reference.

BACKGROUND OF THE INVENTION

1. Field of the Invention

The present invention relates to methods and apparatus for extracting carbon dioxide and hydrogen from seawater and to processes for hydrocarbon production including the carbon dioxide extraction method.

2. Description of the Related Technology

It is desirable to be able to produce jet fuel at sea to support aircraft carrier flight operations. In-theater, synthetic fuel production would offer significant logistical and operational advantages by reducing dependence on increasingly expensive fossil fuels and by reducing the vulnerabilities resulting from unprotected fuel delivery at sea. A ship's ability to produce a significant fraction of the battle group's fuel for operations would increase the operational flexibility and time on station by reducing the mean time between refueling.

Technologies currently exist to synthesize hydrocarbon fuel on land, given sufficient primary energy resources such as coal. Davis, B. H. Topics in *Catalysis* 2005, 32, 143-168. However, these technologies are not $CO_2$ neutral, and they are not practical for sea-based operation. Extracting carbon dioxide from seawater is part of a larger project to create liquid hydrocarbon fuel at sea. Hardy, D. H., et al., "*Extraction of Carbon Dioxide From Seawater by Ion Exchange Resin Part I: Using a Strong Acid Cation Exchange Resin*," Memorandum Report 6180-07-9044; Naval Research Laboratory: Washington D.C., Apr. 20, 2007; Willauer, H. D., et al., "Recovery of $CO_2$ from Aqueous Bicarbonate Using a Gas Permeable Membrane," *Energy & Fuels*, 2009, 23, 1770-1774; Willauer, H. D., et al., "Recovery of $[CO_2]_T$ from Aqueous Bicarbonate Using a Gas Permeable Membrane," NRL Memorandum Report, 6180-08-9129, 25 Jun. 2008; Willauer, H. D., et al., "Extraction of $CO_2$ From Seawater By Ion Exchange Resin Part II: Using a Strong Base Anion Exchange Resins," NRL Memorandum Report, 6180-09-9211, 29 Sep. 2009; Dorner, R. W., et al., "Influence of Gas Feed Composition and Pressure on the Catalytic Conversion of $CO_2$ Using a Traditional Cobalt-Based Fischer-Tropsch Catalyst," *Energy & Fuels*, 2009, 23, 4190-4195; Dorner, R. W., et al., "Effects of Loading and Doping on Iron-based $CO_2$ Hydrogenation Catalyst," NRL Memorandum Report, 6180-09-9200, 24 Aug. 2009; Dorner, R. W., et al., "Mn doped Iron-based $CO_2$ Hydrogenation Catalysts: Detection of $KAlH_4$ as part of the catalyst's active phase," *Applied Catalysis A*, January 2010, Vol. 373, Issues 1-2, pp. 112-121; and Willauer, H. D., et al., "The Effects of Pressure on the Recovery of $CO_2$ by Phase Transition from a Seawater System by Means of Multi-layer Gas Permeable Membranes," *J. Phys. Chem. A*, 2010, 114, 4003-4008. $CO_2$ as a carbon feedstock could be catalytically reacted with hydrogen to form diesel and/or jet fuel. The hydrogen could be produced through commercial off the shelf conventional electrolysis equipment, and the electrical energy for this process would be derived through nuclear power or Ocean Thermal Energy Conversion (OTEC). Mohanasundaram, S. Renewable Power Generation-Utilising Thermal Energy From Oceans. *Enviro. Sci. & Eng.* 2007, 4, 35. Avery, W. H.; Wu, C. *Renewable Energy From The Ocean*; Oxford University Press: New York, 1994. This synthetic fuel production process could provide an alternative energy source to fossil fuels.

Practical, efficient, and economical methods of extracting large quantities of $CO_2$ from seawater must be developed before a sea-based synthetic fuel process that combines hydrogen produced by nuclear power or solar OTEC with $CO_2$ to make jet fuel can be envisioned. The ocean's pH is kept relatively constant at approximately 7.8 by a complex carbonate buffer system. 96% of the carbon in the oceans is in the form of $HCO_3^-$. At pH of 4.5, 99% of all carbonate species in seawater exist as $H_2CO_3$. Thus, in order to convert $HCO_3^-$ to $H_2CO_3$, the pH of seawater must be lowered.

$CO_2$ dissolved in water is in equilibrium with $H_2CO_3$ as shown in equation 1 as:

$$CO_2 + H_2O \leftrightarrow H_2CO_3 \quad (1)$$

The hydration equilibrium constant is $1.70 \times 10^{-3}$. This indicates that $H_2CO_3$ is not stable and gaseous $CO_2$ readily dissociates at pH of 4.5, allowing $CO_2$ to be easily removed by degassing once the seawater has been acidified to ensure that the unstable $H_2CO_3$ is the predominant carbonate species, as discussed above.

A detailed composition of seawater shows a carbon concentration of 28 ppm (~100 mg/L as $CO_2$). Assuming that the carbon exists as $HCO_3^-$, the $HCO_3^-$ concentration in seawater will be approximately 142 ppm (0.0023 M), therefore approximately 23 mL of 0.100 M hydrochloric acid is required per liter of seawater:

$$HCl + HCO_3^- \rightarrow H_2CO_3 + Cl^- \quad (2)$$

$CO_2$ exists only in the dissolved gas form when the pH of seawater is decreased to 6 or less Johnson, K. M., King, A. E., Sieburth, J. Coulometric $TCO_2$ Analyses for Marine Studies: An Introduction. *Marine Chem.* 1985, 16, 61. A strong cation exchange resin material can be used to acidify the seawater to below pH 6. Hardy, D. H. Zagrobelny, M.; Willauer, H. D.; Williams, F. W. *Extraction of Carbon Dioxide From Seawater by Ion Exchange Resin Part I: Using a Strong Acid Cation Exchange Resin*; NRL Memorandum Report 6180-07-9044; Naval Research Laboratory: Washington D.C., Apr. 20, 2007. However, the volume of water per unit weight of resin required to regenerate the resin was much larger than the volume of $CO_2$ recovered, and potentially larger than the volume of fuel produced from the $CO_2$. As a result the approach was deemed impractical for a sea-based application.

Thus as one further avenue to exploit the pH as a means to recover carbon from the sea, an electrochemical acidification cell that is able to decompose water into $H^+$, $OH^-$, hydrogen and oxygen gas by means of electrical energy has been developed and tested. The effects of acidification cell configuration, seawater composition, flow rate, and current on seawater pH are discussed. These data are used to determine the feasibility of this approach for a carbon capture process.

The approach described within is considerably different than traditional electrolysis methods that are specifically tailored toward the production of hydrogen and oxygen from seawater and or fresh water. Most modern military submarines generate their breathing oxygen from the electrolysis of fresh water. The difficulty with current seawater electrolysis technology for hydrogen production is the formation of chlorine gas and thus electrodes are modified such that only oxygen is evolved at the anode. Kato, Z., et al., "Energy-Saving Seawater Electrolysis for Hydrogen Production," *J. Solid State Electrochem.*, 2009, 13, 219-224.

SUMMARY OF THE INVENTION

In a first aspect, the present invention relates to an apparatus for seawater acidification. The seawater acidification apparatus includes an ion exchange (IX) compartment, a cathode electrode compartment, an anode electrode compartment and cation-permeable membranes, which separate the cathode and anode electrode compartments from the ion exchange compartment. The apparatus includes a means for feeding seawater through the ion exchange compartment and means for feeding a liquid media capable of dissociating to provide acidic ions through the anode and cathode electrode compartments. The device also includes a cathode located in the cathode electrode compartment, an anode located in the anode electrode compartment and a means for application of current to each of the cathode and anode to create the driving force for the ion exchange process.

In a second aspect, the present invention relates to a method for the acidification of seawater. In this method, seawater is subjected to an ion exchange reaction to exchange $H^+$ ions for $Na^+$ ions to thereby acidify the seawater.

In a third aspect, the present invention relates to a method for extracting carbon dioxide from seawater. In the method, seawater is subjected to an ion exchange reaction to acidify the seawater to a pH of 6.5 or below by exchange of $H^+$ ions for $Na^+$ ions in the seawater. Once the seawater has been acidified, carbon dioxide is extracted as bound carbon dioxide in the form of bicarbonate, or the acidified seawater is degassed to obtain gaseous carbon dioxide. Optionally, the ion exchange reaction can be conducted under conditions which produce hydrogen as well as carbon dioxide.

In a fourth aspect, the present invention relates to a method for the production of hydrocarbons from seawater. In the method, seawater is subjected to an ion exchange reaction to acidify the seawater to a pH of 6.5 or below by exchange of $H^+$ ions for $Na^+$ ions in the seawater. Once the seawater has been acidified, the acidified seawater is degassed to obtain gaseous carbon dioxide. The carbon dioxide obtained by degassing is fed to a reactor with hydrogen to produce hydrocarbons. Optionally, the ion exchange reaction can be conducted under conditions which produce hydrogen as well as carbon dioxide and the hydrogen produced by the ion exchange reaction can be used as a feed stream to the hydrocarbon production step.

DETAILED DESCRIPTION OF THE PREFERRED EMBODIMENT(S)

Figure 1:
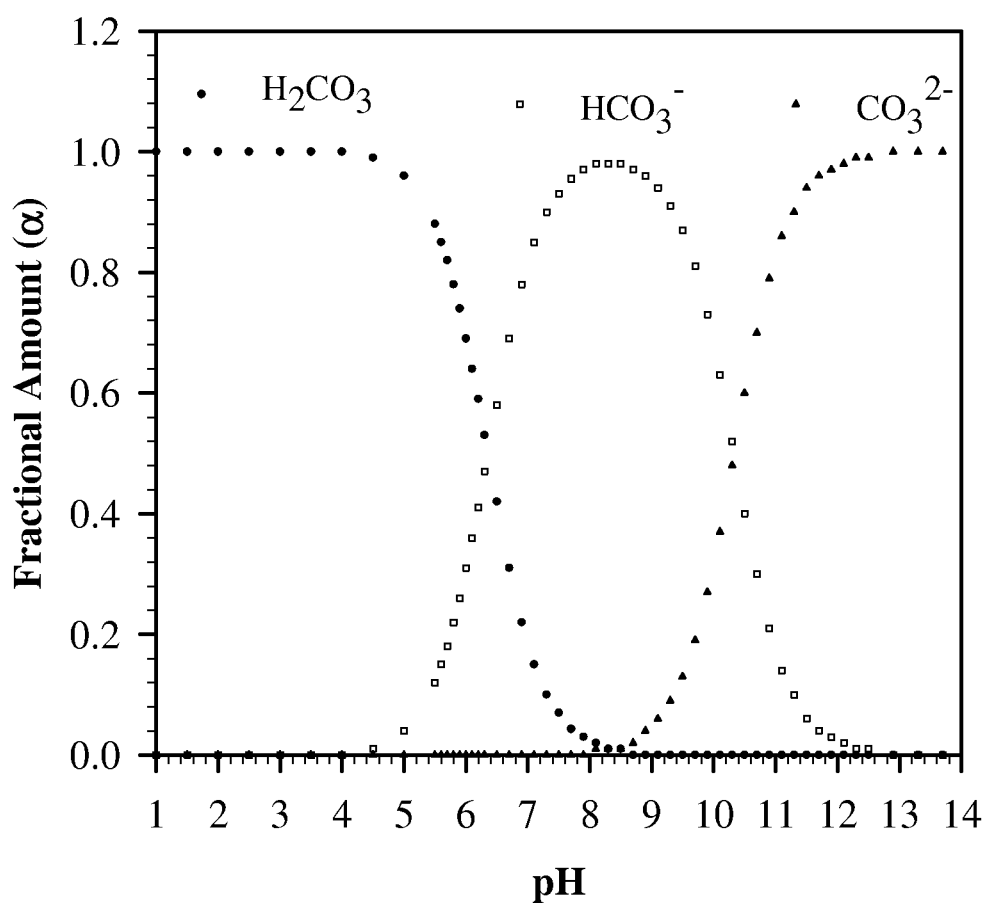
FIG. 1 is a graph of the total carbonate in seawater as expressed as a function of pH

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

In a first aspect, the present invention relates to an apparatus for seawater acidification. The major components of the seawater acidification apparatus 10 shown in FIG. 2 include a central ion exchange (IX) compartment 12, a cathode electrode compartment 14, an anode electrode compartment 16 and cation-permeable membranes 18, 19 which separate the three compartments 12, 14, 16. Seawater is fed to ion exchange compartment 12 via a seawater inlet 20 and removed from ion exchange compartment 12 via a seawater outlet 22. A fluid capable of dissociating to provide acidic ions, such as water, is fed to each of the cathode and anode electrode compartments 14, 16 via cathode fluid inlet 24 and anode fluid inlet 26. The fluid is removed from each of the cathode and anode electrode compartments 14, 16 via cathode fluid outlet 28 and anode fluid outlet 30. The apparatus 10 also includes a cathode 32 and an anode 34. Current is applied to each of the cathode 32 and anode 34 using any conventional electrode apparatus to create the driving force for the ion exchange process.

Figure 2:
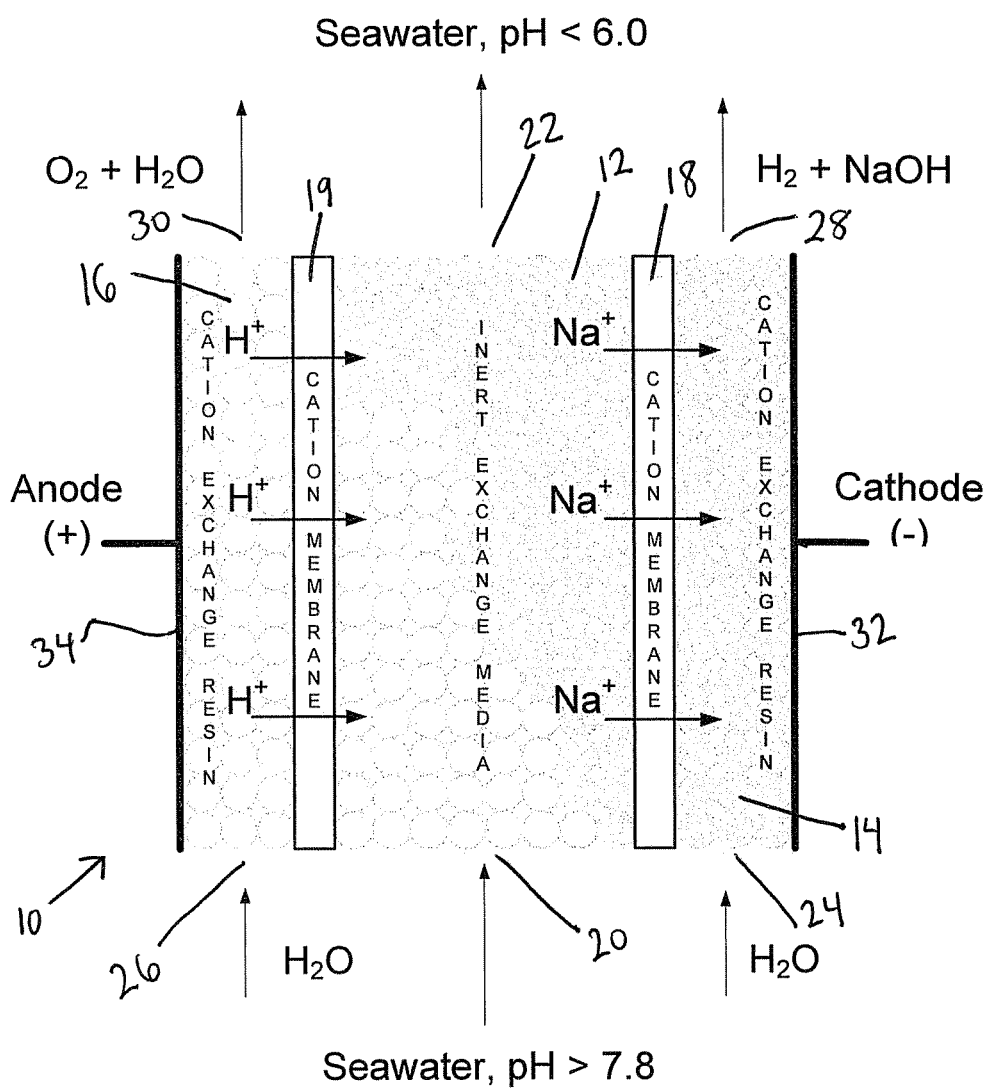
FIG. 2 shows an electrical chemical cell that lowers seawater pH by decomposing water into $H^+$ and $OH^-$, hydrogen gas ($H_2$), and oxygen gas ($O_2$) by means of electrical energy.

The acidification apparatus 10 in FIG. 2 uses small quantities of electricity to exchange sodium ions for hydrogen ions in a central seawater stream that is flowing adjacent to two cation exchange membranes 18, 19. Seawater is passed through the central ion exchange compartment 12 of the apparatus 10. Sodium ions are transferred through the membrane 18 closest to the cathode 32 and removed from the seawater by means of direct current (DC) voltage. These sodium ions are replaced by hydrogen ions as the current drives the ions through the membrane 19 closest to the anode 34. The hydrogen ions entering compartment 12 cause acidification of the seawater.

In apparatus 10, the anolyte is the water fed to the anode compartment 16. At the anode 34, $H^+$ is generated and it must migrate from the surface of the anode 34, through the cation-permeable membrane 19, and into the IX compartment 12 where it can replace $Na^+$. Therefore the anolyte must be as dilute as possible such that the $H^+$ are in excess and do not compete with any other cations in the anolyte. Water with a conductivity of less than 20 S/cm, such as reverse osmosis (RO) permeate, is preferably employed, though deionized water may also be used.

The anode and cathode may be made of any suitable material, based on cost, chemical stability, electrochemical performance characteristics, and the nature of the process involved. For example, the anode may be made of a conventional material, such as ruthenium and/or iridium oxide on titanium metal, titanium oxide ceramic, and platinum plated titanium. Commercially available anodes of this type include those manufactured by Englehard, Water Star (Newbury, Ohio), Eltech (Chardon, Ohio), and Electrode Products (Union, N.J.). The cathode may be stainless steel or steel. Suitable materials are known to those skilled in the art and selection of a particular anode and cathode material is considered within the skill of those knowledgeable in this field.

The cation membrane must selectively pass cations in preference to anions and may be manufactured of any suitable material, based on cost, chemical stability, electrochemical performance characteristics, and the nature of the process involved. Suitable materials are known to those skilled in the art and selection of a particular membrane material is considered within the skill of those knowledgeable in this field. Commercially available examples of heterogeneous and homogeneous cation membranes that are useful in the present invention include, but are not limited to, cation membranes manufactured or sold by Asahi Chemical, Dupont de Nemours, Membrane International Inc., Sybron/Ionics, Resintech, lonpure, Hydro Components, Inc., Tulsion, Tokuyama Soda, MEGA as, and PCA-Polymerchemie Altmeier GmbH. Among these are the membranes formed of perfluorocarbon polymers having cation exchange functional groups that are resistance to oxidation and temperatures. The conditioning and activation can be carried out according to the manufacturer's recommendations.

The use of cation exchange resins in the acidification module compartments can serve as an electro-active media that can exchange or absorb sodium ions and release hydrogen ions. The hydrogen ions generated at the anode thus regenerate the resin to the hydrogen form, releasing sodium ions to pass into the adjacent compartment. Their employment is particularly beneficial when feeding dilute solutions in the electrode compartments as they help to lower the module's electrical resistance and increase efficiency.

Commercially available cation exchange resins that are useful in the present invention include, but are not limited to, cation resins manufactured or sold by Mitsubishi Chemical, Dow Chemical, Rohm and Haas Company, Sybron Chemical Inc., Purolite, and Resin Tech Inc. Preferred cation exchange resins are synthetic organic strong acid cation exchange resins that have sulfonated exchange sites as exemplified by standard cross-linked resins, such as IR-120 (Rohm and Haas), as well as high cross-linked resins, such as SK116 (Mitsubishi Chemical). High surface area macroreticular or micro-porous type ion exchange resins having sufficient ionic conductivity in the catalyst compartment are also suitable.

The catholyte is the water fed to the cathode compartment 14. The catholyte must be free of, or at least substantially free of hardness ions, such as calcium ($Ca^{+2}$), ferrous ($Fe^{+2}$) and magnesium ($Mg^{+2}$). The pH in the cathode compartment 14 is high enough to precipitate these hardness ions. Therefore, a catholyte having a total concentration of hardness ions less than 50 ppm, such as RO permeate or deionized water should be employed.

Any suitable means may be employed to feed seawater to the ion exchange compartment 12 and to feed liquid media to the cathode and anode compartments 14, 16. Suitable means include pumps and pipes employing gravity feed.

Any suitable means may be employed for applying current to cathode and anode 32, 34. Suitable means include a power supply or other current generating apparatus. Preferably, the means for applying charge to the cathode and anode 32, 34 is capable of reversing the polarity of the cathode and anode 32, 34 in order to regenerate the acidification apparatus 10.

One skilled in the art will recognize that smaller particles result in increased pressure drop through a compartment, which decreases operating efficiency. Therefore, the maximum acceptable pressure drop limits the minimum size of the particle, which may vary depending on the acidification module design. The pressure drop through any of the compartments in the acidification module is in the range of 0.1 to 100 psi, and is typically between 1 to 10 psi. The size of the particle must be in the mesh size range of −1 inch to +60; even more preferably from about −¼ inch to +14; and most preferably from about −5 to +7.

The flow rate of solution through the ion exchange compartment is not critical and can be selected from a broad range. However, the flow rate can be controlled to produce a controlled seawater pH. The velocity of the solution through the ion exchange compartment should be at a level where adequate agitation or stirring of seawater through the compartment is achieved. A velocity between 10 to 500 cm/min; more preferably from 30 to 210 cm/min; most preferably from 60 to 90 cm/min may be employed.

The process in accordance with this invention is operated at a current density in the range of 5 to 200 $mA/cm^2$; more preferably from about 20 to 100 $mA/cm^2$; and most preferably from about 50 to 70 $mA/cm^2$.

Figure 3:
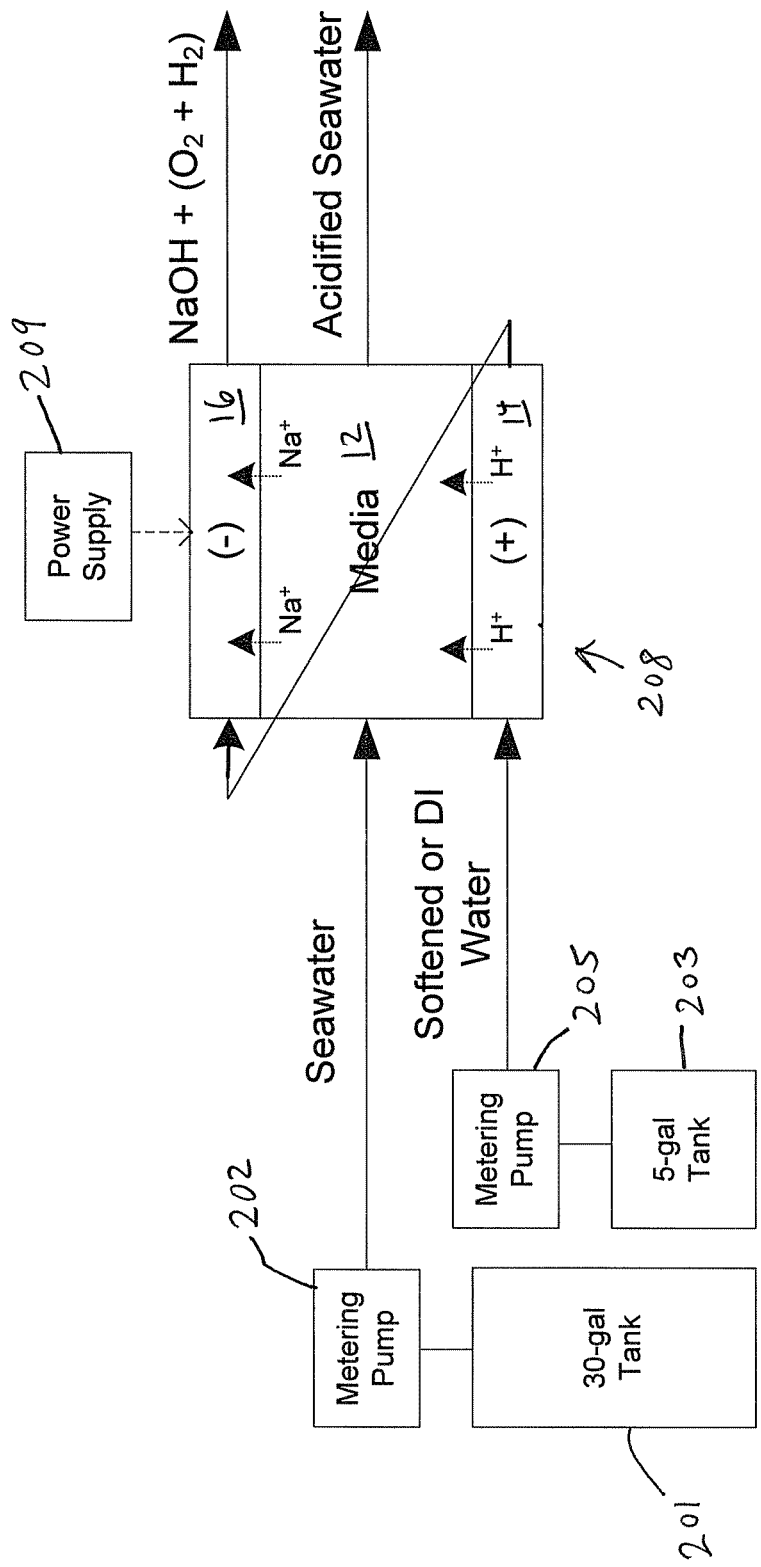
FIG. 3 is a schematic representation showing the acidification apparatus employed in Example 1 for the process of acidifying seawater.

FIG. 3 shows an alternative apparatus 50 for the acidification of seawater including a pump 202 for feeding seawater from a tank 201 to the ion exchange compartment 12 of ion exchanger 208. Softened or deionized water is fed from a tank 203 using a pump 205 to the cathode and anode compartments 14, 16. A power supply 209 is provided to apply a current to the cathode and anode 32, 34 of ion exchange apparatus 208. Acidified sweater is obtained from the ion exchange compartment 12 and a mixture of sodium hydroxide, oxygen and hydrogen is obtained from the cathode and anode compartments 14, 16.

Reactions for Electrochemical Acidification of Seawater

FIG. 2 shows an acidification apparatus 10 which can be employed to exchange $Na^+$ for $H^+$ in a stream that is flowing adjacent to two cation-permeable membranes 18, 19. A small amount of electricity facilitates this exchange. Depicting seawater by sodium chloride (NaCl) and acidified seawater by HCl, the reactions within electrochemical acidification apparatus 10 are as follows:

Anode: $2H_2O \rightarrow 4H^+ + O_2 + 4e^-$ (3)

IX: $4|NaCl|_{Seawater} + 4H^+ \rightarrow 4Na^+ + 4|HCl|_{Acidic\ Seawater}$ (4)

Cathode: $4H_2O + 4Na^+ + 4e^- \rightarrow 4NaOH + 2H_2$ (5)

Overall: $6H_2O + 4NaCl \rightarrow 4|HCl|_{IX} + 4|NaOH| + 2|H_2|_{Cathode} + |O_2|_{Anode}$ (6)

The amount of H⁺ generated is proportional to the applied electrical current, which follows Faraday's constant. Faraday's constant is defined as the amount of electricity associated with one mole of unit charge or electron, having the value 96,487 ampere-second/equivalent.

For the anode reaction, 96,487 A sec will produce ¼ mole $O_2$ gas and 1 mole H⁺ and for the cathode reaction, 96,487 A sec will produce ½ mole $H_2$ gas and 1 mole OH⁻. This allows calculation of the amount of H⁺, OH⁻, $H_2$, and $O_2$ produced per amp/second of current passed through the electrodes:

Anode Reaction $$\left(\frac{1/4 \text{ mole } O_2}{96,487 \text{ A} - sec}\right)\left(\frac{60 \text{ sec}}{\min}\right) = 0.00155 \frac{\text{mole } O_2}{\text{A} - \min} \quad (7)$$

$$\left(\frac{1 \text{ mole } H^+}{96,487 \text{ A} - sec}\right)\left(\frac{60 \text{ sec}}{\min}\right) = 0.000622 \frac{\text{mole } H^+}{\text{A} - \min} \quad (8)$$

Cathode Reaction $$\left(\frac{1/2 \text{ mole } H_2}{96,487 \text{ A} - sec}\right)\left(\frac{60 \text{ sec}}{\min}\right) = 0.000311 \frac{\text{mole } H_2}{\text{A} - \min} \quad (9)$$

$$\left(\frac{1 \text{ mole } OH^-}{96,487 \text{ A} - sec}\right)\left(\frac{60 \text{ sec}}{\min}\right) = 0.000622 \frac{\text{mole } OH^{-1}}{\text{A} - \min} \quad (10)$$

Therefore, for seawater with a $HCO_3^-$ concentration of 142 ppm (0.0023 M) and flow rate of 1 liter per minute, a theoretical applied current of 3.75 A will be required to lower the pH to less than 6.0 and thereby convert $HCO_3^-$ to $H_2CO_3$.

$$\frac{\left(\frac{0.0023 \text{ mole } HCO_3^-}{\text{Liter}}\right)\left(\frac{1 \text{ Liter}}{\min}\right)}{\left(\frac{0.000622 \text{ mole } H^+}{\text{A} - \min}\right)} = 3.75 \text{ A} \quad (11)$$

Current efficiency can be defined as the ratio of the theoretical minimum current predicted by Faraday's law to the actual current applied to the electrodes of the acidification apparatus 10. In actuality, current efficiencies are never 100% and can range from 30 to 95% based on the conductivity of the liquid being treated; the higher the conductivity, the greater the current efficiency. It is estimated that current efficiency for seawater is on the order of 70-90%. Therefore, $$\text{Actual Current} = \left(\frac{\text{Theoretical Current}}{\text{Current Efficiency}}\right) \quad (12)$$

$$= \left(\frac{3.75 \text{ A}}{80\%}\right)$$

$$= 4.69 \text{ A}$$

The theoretical amount of $CO_2$ that can be removed from the acidified seawater is 0.0023 moles per liter. Removal efficiency can be defined as the ratio of the theoretical amount of $CO_2$ removed to the actual amount of $CO_2$ removed in the acidified seawater. Removal efficiencies are never 100% and can range from 50-95% based on various unit operating requirements. The overall removal of $CO_2$ is conservatively estimated to be approximately 50%.

$$\text{Actual Removal} = \left(\frac{\text{Theoretical Removal}}{\text{Removal Efficiency}}\right) \quad (13)$$

$$= \left(\frac{0.0023 \text{ mole/min}}{50\%}\right)$$

$$= 0.0046 \frac{\text{mole } CO_2}{\min}$$

The amount of $H_2$ gas generated at 4.75 A is $$\left(\frac{1/2 \text{ mole } H_2}{96,487 \text{ A} - sec}\right)\left(\frac{60 \text{ sec}}{\min}\right)(4.75 \text{ A}) = 0.0015 \frac{\text{mole } H_2}{\min} \quad (14)$$

Under these theoretical conditions, the molar ratio of $H_2$ and $CO_2$ is 0.32. Increasing the current increases the molar ratio of hydrogen to carbon dioxide with no effect on the operation of the acidification apparatus 10. H⁺ generated will either exchange with Na⁺ in the seawater to further lower its pH or migrate through the IX compartment 12 and into the cathode compartment 14 where it will combine with OH⁻ to form water.

Bound $CO_2$ can be captured from seawater in the form of bicarbonate. $CO_2$ in seawater of pH of less than 4.5 can be naturally and completely degassed upon exiting the acidification cell by exposure to the atmosphere. $CO_2$ in seawater having a pH greater than 4.5 may require assistance to degas, by, for example, vacuum degassing for complete $CO_2$ removal. The degree of vacuum degassing required to completely remove $CO_2$ increased as the seawater pH increased.

The cation exchange resin can be electrolytically regenerated, allowing simultaneous and continuous ion exchange and regeneration to occur within the apparatus. This eliminates the need for regeneration by caustic chemicals that are not ideal for a sea-based application. The degree of ion exchange and regeneration within the cell is a function of the current applied. Lowering the pH of seawater is an electrically driven membrane process, where seawater pH is proportional to applied current and independent of the media contained within the IX compartment. The examples below show that carbon dioxide was readily removed from seawater at pHs of less than 6.0. Unassisted and near complete degassing was observed in seawater samples of pH of 5.0 and less. Assisted degassing by vacuum was required in seawater samples at pHs of greater than 5.0. The relationship between seawater bicarbonate concentration, applied current, and seawater pH was demonstrated using Key West seawater. The experimental set-up did not allow for recoveries of greater than 95%. It is important to know the upper limit of recovery since resources (space and energy) are required to produce a dilute water stream for feeding to electrode compartments 24, 26.

In addition to carbon dioxide, the apparatus produced a portion of the hydrogen needed for a hydrocarbon synthesis process with no additional energy penalty. The production of hydrogen gas at the cathode as a byproduct occurred at a rate that correlated with the applied current. Thus the applied current to the apparatus can be increased to generate more hydrogen gas with no negative performance or operational effects on the acidification process. The acidification apparatus' ability to produce a portion of the hydrogen needed for the downstream synthesis of hydrocarbons from the recovered carbon dioxide reduces the operational footprint of the process, thus making the technology more feasible for a sea-based application.

In another aspect, the present invention relates to a method for the acidification of seawater. In the method, seawater is subjected to an ion exchange reaction to exchange $H^+$ ions with $Na^+$ ions in the seawater to thereby acidify the seawater. The seawater is acidified to a pH of less than about 6.5, more preferably, to a pH of less than about 6.0, even more preferably to a pH of less than about 5.0 and, most preferably, to a pH of less than about 4.5. Acidification of the seawater causes carbonic acid formation in the seawater, which allows for recovery of carbon dioxide from the acidified seawater.

Bound carbon dioxide can be removed from the acidified seawater in the form of bicarbonate. Alternatively, the acidified seawater can be degassed to obtain carbon dioxide. Acidified seawater can be directly degassed by exposure to atmosphere if the pH of the acidified seawater is less than about 5.0 and, greater recoveries of carbon dioxide can be obtained if the pH of the acidified seawater is less than about 4.5. For acidified seawater having a pH of from about 4.5 to about 6.5, degassing may be assisted by, for example, application of a vacuum. A suitable apparatus for degassing acidified seawater is a vacuum stripper. Any other device that is capable of creating a vacuum such that the gas pressure is substantially less than atmospheric pressure may be employed.

Figure 7:
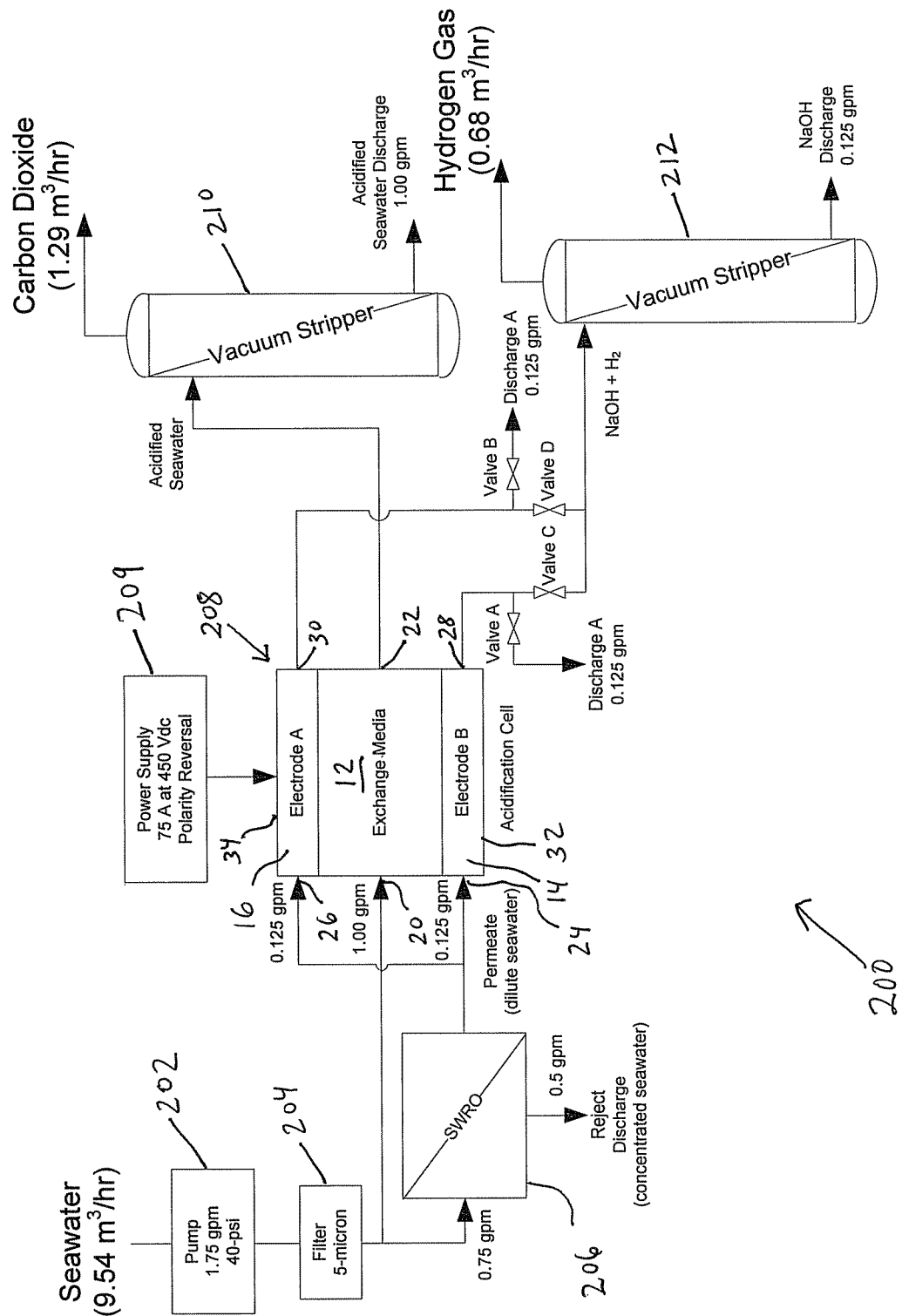
FIG. 7 is a schematic diagram of an apparatus for seawater acidification and recovery of carbon dioxide and hydrogen in accordance with the present invention.

Referring to FIG. 7, there is shown an apparatus 200 for recovery of carbon dioxide and hydrogen from seawater. The apparatus 200 includes a pump 202 which pumps raw seawater through a filter 204, preferably having pores of about 5 microns to filter particulate matter from the seawater. The filter 204 is optional, though preferred to reduce the potential for fouling, especially in embodiments employing seawater reverse osmosis device 206. The filtered seawater may then be fed to the ion exchanger 208, as shown. Alternatively, a portion of the filtered seawater may be fed to the seawater reverse osmosis device 206 and a portion of the filtered seawater may be fed to the ion exchanger 208. If a seawater reverse osmosis device is employed, concentrated seawater is discharged as waste and permeate, dilute seawater, may be employed as the liquid fed to the cathode and anode compartments 14, 16 of ion exchanger 208. Ion exchanger 208 is provided with a power supply 209 with the capability of reversing the polarity of electrodes 32, 34 for regeneration of ion exchanger 208. Ion exchanger 208 functions as an acidification cell for acidification of the seawater fed to ion exchange compartment 12 via seawater inlet 20 as described above in relation to FIG. 2.

Acidified seawater leaves ion exchange compartment 12 via seawater outlet 22 and is then fed to vacuum stripper 210 to strip carbon dioxide gas from the acidified seawater. All or a portion of the fluid from cathode and anode compartments 14, 16 may be fed to a vacuum stripper 212 to extract hydrogen gas from the fluid. The process may provide both carbon dioxide and hydrogen gas, depending upon the specific conditions employed in ion exchanger 208.

While the plate-and-frame configuration of the acidification module 200 illustrated in FIG. 7 is presently considered preferable, any module configuration can be used in accordance with this invention. Such configurations include, but are not limited to, spiral and cylindrical tube designs. Module orientation, or positioning of the electrodes, may be horizontal or vertical.

The thickness of the ion exchange compartment 12 can be varied depending on the desired module performance. The ion exchange compartment 12 thickness may be adjusted depending on operating parameters, such as flow rate, temperature, etc., and/or desired reactor performance, such as product pH, electrical resistance, etc., and is typically between 0.3 to 10.0 cm. The width of the chamber defining the ion exchange compartment may be adjusted depending on operating parameters and desired module performance, and the width to thickness ratio is typically between 5 and 20. There is no limit on the length of the chamber other than as dictated by practical construction and fluid pressure loss considerations.

Solution can be passed through any of the compartments in the electrolytic reactor from bottom to top or from top to bottom. The flow direction in two adjacent compartments can be co-current or counter-current. Solution can be passed in parallel through each compartment, or a least one stream may flow in series through at least two compartments.

The components of the acidification module 200 may be made from a polymeric (plastic) material that is chemically resistant and non-conductive. Such materials include, but not limited to, PVC, chlorinated PVC, ABS, Kynar™, Teflon™, and other fluoropolymers.

The closing or sealing of the acidification module 200 can be achieved using tie-bars, hydraulic or pneumatic type presses, or by solvent or adhesive bonding.

Figure 8:
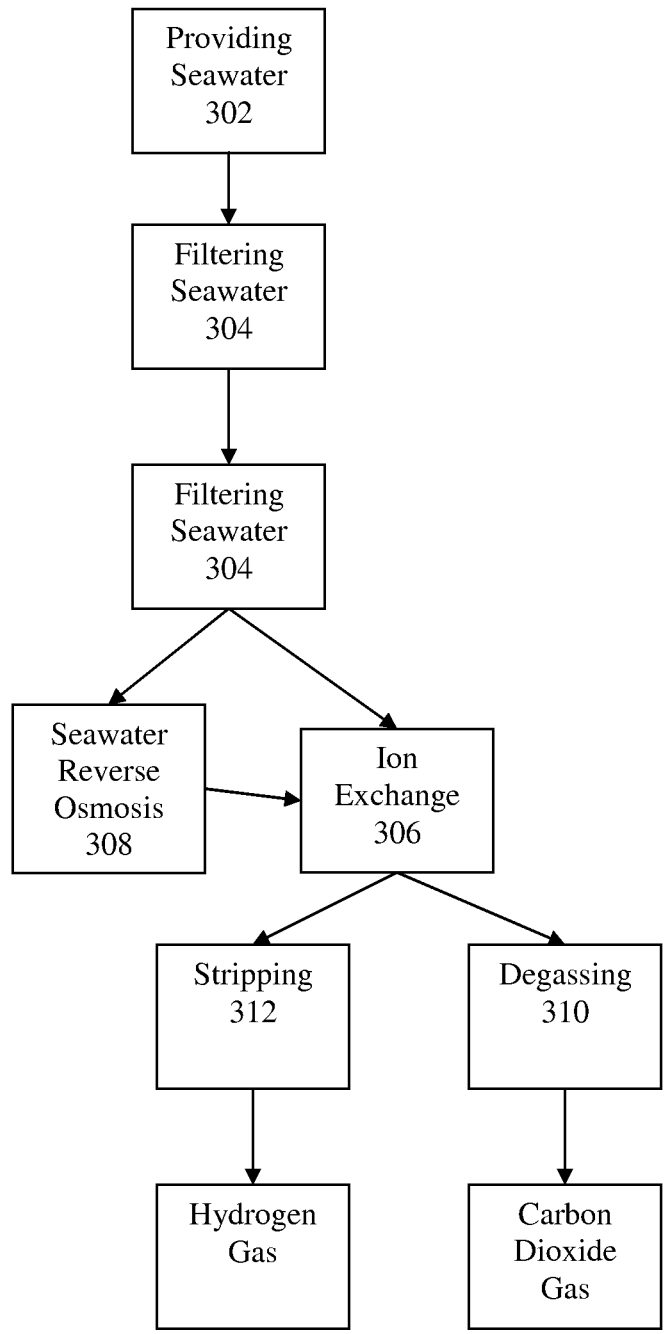
FIG. 8 is a schematic flow diagram of a carbon dioxide production process in accordance with the present invention.

The method 300, shown in FIG. 8, involves the steps of providing seawater 302 and filtering seawater 304. Filtered seawater is fed to ion exchange compartment 12 of ion exchanger 208 and subjected to an ion exchange step 306 to acidify the seawater. A portion of the filtered seawater may be subjected to a seawater reverse osmosis step 308 and the permeate of this step may be fed to the cathode and anode compartments 14, 16 of ion exchanger 208 for use as the ion exchange fluid in ion exchange step 306. Acidified seawater produced in ion exchange step 306 may then be fed to degassing step 310 to separate carbon dioxide from the acidified seawater. The ion exchange fluids from cathode and anode compartments 14, 16 may be fed to stripping step 312 to separate hydrogen from the ion exchange fluids.

Carbon dioxide produced by the process of the present invention may be fed to a reactor for the production of hydrocarbons such as jet fuels. Alternatively, the carbon dioxide may be used in industrial and marine fire extinguishing systems. Hydrogen produced by the process of the present invention may also be fed to the same hydrocarbon production reactor or alternatively, may be used for other purposes, such as fuel.

Optionally, in the method of FIG. 8, the polarity of the electrodes 32, 34 of the ion exchanger 208 may be reversed from time to time in ion exchange step 306 to regenerate ion exchanger 208.

As shown in the examples below, an electrochemical acidification cell has been developed, tested, and found to be practical for recovering large amounts of $CO_2$ from seawater for use as a carbon feedstock in a sea-based fuel production process.

The invention will be illustrated by the following non-limiting examples.

EXAMPLES

Materials and Methods

In this test series two different acidification cells were evaluated; Nalco™ and Ionpure™. Tables 1 and 2 provide a detailed description of each cell's electrical and flow rate specifications along with the materials used in the cell configurations. The anode used in the Nalco™ cell is a dimensionally stable anode (DSA) composed of a mixed precious metal oxide coating on titanium. The Ionpure™ cell uses a platinum plated titanium anode.

This example demonstrates the flow rate to current ratio required to lower seawater pH to the target level. In addition to having different anode materials, each cell contains a different type of cation-permeable membrane. The Nalco™ cell contains Sybron's MC-3470™ reinforced/casted cation permeable membrane, while the Ionpure™ cell contains a polyethylene extruded cation permeable membrane.

TABLE 1

Nalco ™ Cell Configured as an Electrochemical Acidification Cell

| Dimensions | |
| --- | --- |
| Approximate Overall Cell Dimension | 14.0 cm × 36.5 cm × 6.0 cm |
| IX Compartment Width | 5.1 cm |
| IX Compartment Height | 30.1 cm |
| IX Compartment Thickness | 1.2 cm |
| IX Compartment Volume | 184.2 cm$^3$ |
| Membranes Active Area | 153.5 cm$^2$ |
| Electrode Compartment Volume | 98.4 cm$^3$ |
| Electrical Specification | |
| Electrode Active Area | 153.5 cm$^2$ |
| Max. Current Density | 100 A m$^{-2}$ |
| Flow Specification | |
| Max. Flow Rate | 20 cm$^3$ s$^{-1}$ |
| Max. Electrolyte Flow Rate | 10 cm$^3$ s$^{-1}$ |
| Max. Operating Temperature | 60° C. |
| Max. Operating Pressure | 350 kPa |
| Materials | |
| Anode | Dimensionally Stable Anode (DSA-600) |
| Cathode | 316L Stainless Steel |
| Membrane | Sybron Cation-Permeable Membrane |
| Molded Frame and End Block | Acrylonitrile Butadiene Styrene (ABS) |

TABLE 2

Ionpure ™ Cell Configured as an Electrochemical Acidification Cell

| Dimensions | |
| --- | --- |
| Approximate Overall Cell Dimension | 33 cm × 61 cm × 8 cm |
| IX Compartment Width | 14 cm |
| IX Compartment Height | 35.5 cm |
| IX Compartment Thickness | 0.9 cm |
| IX Compartment Volume | 429 cm$^3$ |
| Membranes Active Area | 497 cm$^2$ |
| Electrode Compartment Volume | 214 cm$^3$ |
| Electrical Specifications | |
| Electrode Active Area | 497 cm$^2$ |
| Max. Current Density | 400 A m$^{-2}$ |
| Flow Specifications | |
| Max. Flow Rate | 35 cm$^3$ s$^{-1}$ |
| Max. Electrolyte Flow Rate | 35 cm$^3$ s$^{-1}$ |
| Max. Operating Temperature | 60° C. |
| Max. Operating Pressure | 350 kPa |
| Materials | |
| Anode | (Platonized Titanium) |
| Cathode | 316L Stainless Steel |
| Membrane | Ionpure Cation-Permeable Membrane |
| Molded Frame and End Block | Polyethylene (PE) |

Electrochemical Acidification Tests

FIG. 3 is a schematic representation of the acidification experimental set-up. Seawater was passed upwardly through the ion exchange (IX) compartment. Deionized water at a pH of approximately 6.7 was passed, in series, upwardly through the anode compartment and then upwardly through the cathode compartment. A controlled current was applied to the anode and cathode in order to lower the pH of the seawater to the target level. Only a single pass of seawater and deionized water through the cell was employed.

Five different types of seawater were evaluated in this test series. Four of these types were synthetic seawater formulations (designated as IO-1, IO-2, IO-3, IO-4) created from instant ocean seawater while the other was actual seawater taken from a laboratory in Key West Fla. (KW). The synthetic formulations were prepared at least 16 hours prior to use to allow the buffer salts to reach equilibrium. The concentrations and measured pH of the seawater solutions is given below. The pH of the solutions varied as a result of equilibration with $CO_2$ gas in the atmosphere. These pH changes had no effect on the overall performance of the acidification cell. All pH measurements were conducted with a standardized Fisher combination glass electrode. The carbon dioxide content of the solutions was measured by a UIC Coulometric system (UIC Inc, Joliet, Ill.).

IO-1—Synthetic seawater was prepared by dissolving 41.1 g L$^{-1}$ of Instant Ocean Sea Salt in deionized water at a total volume of 100 liters. The pH of the synthetic seawater was 9.1±0.5. The $CO_2$ content was not measured.

IO-2—Synthetic seawater was prepared by dissolving 35 g L$^{-1}$ of Instant Ocean Sea Salt in deionized water at a total volume of 140 liters. The pH of the synthetic seawater was 8.4±0.2. The $CO_2$ content was not measured.

IO-3—Synthetic seawater, made using Instant Ocean Sea Salt at 35 g L$^{-1}$, was supplemented with 90 ppm of sodium bicarbonate and diluted with deionized water to a total volume of 140 liters. The pH of the synthetic seawater was 8.2. The $CO_2$ content was measured to be approximately 100 ppm.

IO-4—Synthetic seawater, made using Instant Ocean Sea Salt at 35 g L$^{-1}$, was supplemented with 90 ppm of sodium bicarbonate and diluted with deionized water to a total volume of 140 liters. The pH was adjusted to 7.6 using approximately 20 mLs of diluted hydrochloric acid (5 mL of concentrated HCl diluted to 50 mL) added to 100 liters of synthetic seawater. The $CO_2$ content was measured to be approximately 100 ppm.

KW—Actual Seawater from the Naval Research Laboratory Key West, Fla. The pH was 7.6±0.2 and the $CO_2$ content was measured to be approximately 100 ppm.

Degassing measurements were made on selective samples during the course of the experiment. For each measurement carbon dioxide was degassed from solution using a Brinkmann Roto-Evaporator. A 20 mL sample was placed in a 1000 mL round bottomed flask and rotated at an rpm setting of 8 for five minutes. A water aspirator was used to provide a vacuum of approximately 15 mm Hg.

Example 1

In the first example, the Nalco™ cell (Table 1) was configured such that a strong acid cation exchange resin was used to fill both the ion exchange compartment (IX) and the electrode compartments shown in FIG. 2. IO-1 seawater was used as the influent, and passed through the IX compartment at 140 ml/min for 165 minutes. The flow rate of the deionized water passing through the electrode compartments was increased to a final flow rate of 140 mL/min. The results summarized in Table 3 show that when 3 amps of current where applied to the cell, the pH of the effluent seawater was lowered to between 2.08 and 2.15. As the current was decreased from 3 to 0.25 amps, the pH of the effluent seawater was increased to 5.88. These results demonstrate that the pH of the effluent seawater can be lowered using the Nalco™ cell. These results also show that the pH of the seawater is proportional to the applied current and demonstrate that the cation exchange resin can be electrolytically regenerated.

The flow rate to current ratio when the seawater pH was 5.88 is estimated to be 560 as follows: 140 mL/min/0.25 amps=560. This ratio is higher than the theoretical ratio of 267 calculated for the same conditions as described in equation 11 as:

1000 mL/min/3.75 amps=140 mL/min/$X$ $X$=0.525 Amps

Theoretical Ratio: 140 mL/min/0.525 amps=267.

This indicates that the $HCO_3^-$ levels in the IO-1 synthetic formulation may not be at the correct concentration, even though the pH was high. The recovery was 50% and was not lowered in this experiment. The term "recovery" is used to define the ratio of product quantity (influent seawater flow rate, Table 3) to the total feed quantity to the cell (influent seawater flow rate and influent deionized flow rate, Table 3), and is expressed as a percentage. The water required in the electrode compartments must be dilute and free from ions that create hardness. A filtration process such as reverse osmosis should be used to treat this type of water. A high recovery allows the size of the filtration unit to be minimized and the energy requirements for the unit to be reduced.

TABLE 3

Acidification of IO-1 seawater at 140 mL/min

| Time, min | Amp/Volt | Influent Seawater Flow Rate, mL min$^{-1}$ | Influent DI Flow Rate, mL min$^{-1}$ | Effluent Acidified Seawater pH | Effluent DI Cathode pH |
|---|---|---|---|---|---|
| 15 | 3.0/9.0 | 150 | 80 | 2.08 | 12.69 |
| 30 | 3.0/10.0 | 140 | 77 | — | — |
| 45 | 3.0/10.0 | 140 | 75 | 2.15 | 12.63 |
| 60 | 3.0/11.0 | 140 | 75 | 2.10 | 12.49 |
| 75 | 3.0/12.0 | 140 | 144 | — | — |
| 90 | 2.0/9.0 | 140 | 140 | 2.19 | 12.13 |
| 105 | 1.0/6.0 | 140 | 140 | 2.70 | 12.00 |
| 120 | 0.5/4.0 | 140 | 140 | 3.61 | 11.41 |
| 135 | 0.25/3.0 | 140 | 140 | 5.88 | 11.26 |
| 150 | 0.0/0.0 | 140 | 140 | — | — |
| 165 | 0.0/0.0 | 140 | 140 | 8.76 | 10.41 |

Example 2

In the second example, O-2 was used to determine the effect that flow rate through the IX compartment had on the performance of the Nalco™ cell. Initially IO-2 was pumped at 900 mL/min before a flow of 860 mL/min was established and maintained after 90 minutes. The results summarized in Table 4 establish that at higher flow rates the pH of the effluent seawater can be lowered using the acidification cell. Higher influent seawater flow rates increase the percent recovery from 50% to 86%. In addition the results indicate that the flow rate to current ratio was improved from 560 to 716 (860 mL/min/1.20 amps).

TABLE 4

Acidification of IO-2 seawater at 900 mL/min

| Time, min | Amp/Volt | Influent Seawater Flow Rate, mL min$^{-1}$ | Influent DI Flow Rate, mL min$^{-1}$ | Effluent Acidified Seawater pH | Effluent DI Cathode pH |
|---|---|---|---|---|---|
| 15 | 1.0/5.0 | 900 | 140 | 7.31 | 11.79 |
| 30 | 1.5/7.0 | 900 | 140 | 6.13 | 12.06 |
| 45 | 1.5/7.0 | 864 | 140 | 5.95 | 12.04 |
| 60 | 1.5/7.0 | 870 | 140 | 4.63 | 11.90 |
| 75 | 1.5/7.0 | 864 | 140 | 4.41 | 11.89 |
| 90 | 1.5/7.0 | 868 | 140 | 4.30 | 11.75 |
| 105 | 1.5/7.0 | 860 | 140 | 4.18 | 11.76 |
| 120 | 1.5/7.0 | 860 | 140 | 4.05 | 11.74 |
| 135 | 1.0/6.0 | 860 | 140 | 6.31 | 11.12 |
| 150 | 1.0/6.0 | 860 | 140 | 6.20 | 11.42 |
| 165 | 1.0/6.0 | 860 | 140 | 6.27 | 11.52 |
| 180 | 1.2/6.5 | 860 | 140 | 6.17 | 11.20 |

Example 3

The third example examines the effects of replacing the strong cation exchange material in the IX compartment of the cell with inert ceramic particles. The affects of the ceramic media on the ion exchange efficiency of $Na^+$ for $H^+$ ions in the cell is determined in the results shown in Table 5.

TABLE 5

Acidification of IO-2 Seawater at 680 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH | Effluent DI Cathode pH |
|---|---|---|---|---|---|
| 15 | 1.0/8.0 | 680 | 140 | 8.29 | 11.88 |
| 30 | 1.0/8.0 | 680 | 140 | 8.48 | 11.88 |
| 45 | 1.0/8.0 | 680 | 140 | 8.28 | 11.87 |
| 60 | 1.0/8.0 | 680 | 140 | 7.13 | 11.87 |
| 75 | 1.0/8.0 | 680 | 140 | 6.62 | 11.90 |
| 90 | 1.0/8.0 | 680 | 140 | 6.10 | 11.88 |
| 105 | 1.0/8.0 | 680 | 140 | 5.51 | 11.88 |
| 120 | 1.0/8.0 | 680 | 140 | 4.22 | 11.52 |
| 135 | 1.0/8.0 | 680 | 140 | 6.46 | 11.25 |
| 150 | 0.8/6.0 | 680 | 140 | 6.30 | 11.33 |
| 165 | 0.9/6.5 | 680 | 140 | 5.87 | 11.36 |
| 180 | 0.9/7.0 | 680 | 140 | 5.83 | 11.42 |

Example 4

At a flow rate of 680 mL/min to the IX compartment and an applied current of 1.0 amps, the pH of IO-2 is reduced from 8.29 to 6.3 in 150 minutes. Since the pH of the IO-2 water can be lowered with inert media in the IX compartment the process is considered to be an electrically driven membrane process. The progressive decrease in the IO-2 pH indicates that the cation exchange resin in the anode compartment was regenerating. Since the cation exchange resin in the anode compartment was in the sodium form during the start of the experiment and that $H^+$ ions from the oxidation of water on the anode exchanged on the resin and released $Na^+$ ions. These $Na^+$ ions then migrated through the cation exchange membrane and into the IX compartment. Breakthrough of $H^+$ ions into the IX compartment began at 60 minutes when the pH of the seawater began to decrease. See FIG. 1 for illustrative details. The high and stable pH of the NaOH is a result of this. The flow rate to current ratio was further improved from 716 to 755 (680 mL/min/0.90 amps) at a recovery of 83% using this process.

When the flow rates to the IX compartment and the electrode compartments were dropped (680 mL/min to 140 mL/min in the IX compartment) (120 mL/min to 18 to 10 mL/min) as shown in Table 6, there was an improvement in the flow rate to current ratio 1,207 (140 mL/min/0.116 amps). In addition, the lower flow rates to the cell increased the recovery from 88% to 95%.

TABLE 6

Acidification of IO-2 seawater at 140 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH | Effluent DI Cathode pH |
|---|---|---|---|---|---|
| 60 | 0.178/4.75 | 140 | 18 | 3.96 | 10.82 |
| 120 | 0.169/4.63 | 140 | 16 | 4.19 | 10.92 |
| 180 | 0.136/4.27 | 140 | 17 | 5.30 | 10.84 |
| 240 | 0.116/4.03 | 140 | 18 | 6.07 | 10.82 |
| 300 | 0.116/3.99 | 140 | 17 | 5.75 | 10.92 |
| 360 | 0.116/3.91 | 140 | 10 | 5.92 | 10.84 |
| 420 | 0.116/3.79 | 140 | 10 | 5.88 | 10.88 |

Example 5

With the optimum cell configuration and flow rates established by previous experiments, Key West seawater was used in order to simulate sample conditions that would be encountered in an actual ocean process for sequestering $CO_2$. The results summarized in Table 7 show that the flow rate to current ratio was significantly reduced to approximately 298 (140 mL/min/0.47 amps).

TABLE 7

Acidification of KW seawater at 140 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 1 | 0.15/3.14 | 140 | 10 | 5.52 |
| 2 | 0.15/3.13 | 140 | 10 | 6.05 |
| 3 | 0.15/3.14 | 140 | 10 | 6.14 |
| 4 | 0.15/3.14 | 140 | 10 | 6.23 |
| 5 | 0.15/3.14 | 140 | 10 | 6.29 |
| 6 | 0.17/3.21 | 140 | 10 | 6.35 |
| 7 | 0.17/3.23 | 140 | 10 | 6.35 |
| 9 | 0.19/3.37 | 140 | 10 | 6.42 |
| 11 | 0.21/3.45 | 140 | 10 | 6.42 |
| 13 | 0.26/3.61 | 140 | 10 | 6.37 |
| 15 | 0.31/3.84 | 140 | 10 | — |
| 17 | 0.40/4.06 | 140 | 10 | 6.20 |
| 19 | 0.47/4.33 | 140 | 10 | 6.09 |
| 21 | 0.47/4.34 | 140 | 10 | 6.04 |
| 23 | 0.47/4.33 | 140 | 10 | 5.97 |

Example 6

This ratio is very similar to the theoretical ratio of 267, indicating the correct $HCO_3^-$ level, and the recovery was at 94%. When the $CO_2$ content of the KW seawater was measured by coulometry, it was found to contain 4 times more alkalinity than measured in the IO-1 and IO-2 seawater formulations. This is clearly evident from the data in Table 7 which shows that it required 0.47 amps to decrease the pH of the KW seawater from 7.60 to 5.97. Previous acid titrations used to assess the $CO_2$ concentration of the KW seawater were consistent with the results of this example. An average of 20 mLs of 2.00 E$^{-03}$ M of hydrochloric acid was required to reduce the pH in a 20 mL sample of Key West seawater to 6.0. This required 4.05 E$^{-05}$ moles of hydrogen ions. Based on a flow rate of 140 mL/min and the use of Faraday's constant, 0.000622 mol $H^+$/A-min (equation 9), a current of 0.46 amps will generate 4.05 E$^{-05}$ moles of hydrogen ions. The current efficiency in the electrolytic cell was approximately 98%.

In the sixth example, a new IO formulation (IO-3) was made that had a similar alkalinity concentration as that found in KW seawater. However, the pH was 8.19 compared to the 7.67 measured for the KW seawater. Table 8 shows that the amount of current required to reduce the pH of IO-3 from 8.19 to 6.0 was approximately three times higher than that seen in previous example. The flow rate to current ratio was approximately 111 (140 mL min$^{-1}$/1.26 amps), which is lower than the theoretical ratio of 267. The recovery was between 88% and 95%. The $CO_2$ content in IO-3 was found to be adequate so the low ratio may be attributed to the acidification cell not having been operated long enough to reach equilibrium.

TABLE 8

Acidification of IO-3 seawater at 140 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 15 | 0.46/4.58 | 140 | 10 | 6.52 |
| 30 | 0.48/4.89 | 138 | 9 | 6.42 |
| 45 | 0.49/4.71 | 140 | 18 | 6.48 |
| 60 | 0.49/4.69 | 138 | 9 | 6.78 |
| 75 | 0.51/4.79 | 140 | 9 | 6.65 |
| 90 | 0.65/5.31 | 139 | 8 | 6.48 |
| 105 | 0.72/5.66 | 140 | 18 | 6.36 |
| 120 | 0.99/6.74 | 140 | 18 | 6.24 |
| 135 | 1.12/7.27 | 140 | 19 | 6.10 |
| 150 | 1.26/7.90 | 140 | 19 | 5.94 |
| 165 | 1.44/8.46 | 140 | 19 | 5.78 |

TABLE 8-continued

Acidification of IO-3 seawater at 140 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 180 | 1.66/9.75 | 140 | 18 | 5.57 |
| 195 | 1.99/12.17 | 140 | 18 | 5.14 |
| 225 | 1.99/12.06 | 140 | 9 | 5.03 |
| 255 | 1.31/9.77 | 140 | 9 | 5.86 |

Example 7

A new IO formulation for example 7 was made in an effort to create a synthetic system that had a similar pH and alkalinity to KW seawater. When IO-4 was used to challenge the acidification cell, the results shown in Table 9 indicate that the amount of current required to reduce the pH to 6.0 was approximately two times higher (0.47 vs 0.89 amps). The flow rate to current ratio was approximately 157 (140 mL/min/0.89 amps), which is lower than the theoretical ratio of 267. The recovery at these flow rates was between 88% and 95%. The $CO_2$ content in IO-4 was found to be adequate so the low ratio may be attributed to the acidification cell not having been operated long enough to reach equilibrium.

TABLE 9

Acidification of IO-4 seawater at 140 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 15 | 1.33/12.23 | 140 | 9 | 3.42 |
| 30 | 0.97/10.51 | 140 | 9 | 5.57 |
| 45 | 0.88/9.89 | 140 | 9 | 6.11 |
| 75 | 0.89/10.20 | 140 | 9 | 6.03 |
| 105 | 0.89/10.50 | 140 | 9 | 6.09 |
| 135 | 0.89/10.88 | 140 | 19 | 6.19 |
| 210 | 1.51/13.79 | 140 | 19 | 2.76 |
| 255 | 1.15/12.43 | 140 | 19 | 4.42 |

Example 8

Demonstrating the feasibility of scaling this process was the objective of Example 8 (Table 10). The larger Ionpure™ cell (Table 2) was configured similarly to the Nalco™ cell used in Examples 3-7. IO-4 was used to challenge the cell at a flow rate of 1050 mL/min to the IX compartment. From Table 10 the amount of current required to reduce the pH from 7.6 to 4.5 was approximately 4.87 amps. The flow rate to current ratio was approximately 216 (1050 mL min$^{-1}$/4.87 amps). This ratio is lower than the theoretical ratio of 267. The recovery was 90%. Since the $CO_2$ content in IO-4, was similar to that measured in KW seawater, the low ratio may be attributed the acidification cell not having been operated long enough to reach equilibrium.

TABLE 10

Acidification of IO-4 seawater at 1050 mL/min using Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 20 | 3.51/5.62 | 1050 | 116 | 7.18 |
| 40 | 4.49/6.74 | 1050 | 118 | 6.82 |
| 60 | 5.54/7.52 | 1050 | 118 | 6.24 |
| 80 | 6.53/8.40 | 1050 | 114 | 4.23 |
| 100 | 6.24/8.24 | 1050 | 114 | 3.44 |
| 120 | 5.02/7.42 | 1050 | 116 | 4.75 |
| 140 | 4.75/7.24 | 1050 | 116 | 4.21 |

Example 9

The Ionpure™ cell was re-configured in Example 9 (Table 11) such that no material was used in IX compartment of the cell. Table 11 shows that the results were consistent with the results of Example 8 (Table 10) during the first 100 minutes of operation which further indicates that this process is an electrically driven membrane process, whereby the media contained in the IX compartment has no effect on the acidification of the seawater. After 100 minutes of operation, voltage and flow rate irregularities occurred indicating internal disruption due to non-supported membranes. The pH began to increase and the flow rate began to decrease in the IX compartment while the flow rate increased and pH decreased in the electrode compartments, indicating a gross leak between compartments.

Towards the end of this Example 9 (Table 11), a crude electrode gas ($H_2$ and $O_2$) capture experiment was performed, but both gases were captured together due to a common electrode compartment inlet and outlet. The combined gas captured was approximately 10 mL/min per amp. This is close to theoretical according to Faraday's law which indicated an expected value of 10.5 ml/min (7.0 mL/min $H_2$+3.5 mL/min $O_2$) per amp at the standard conditions of temperature and pressure.

TABLE 11

Acidification of IO-4 seawater at 1050 mL/min Without Inert Material

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 20 | 4.70/9.40 | 1020 | 120 | 7.59 |
| 40 | 4.81/9.32 | 1040 | 116 | 7.17 |
| 60 | 4.97/9.37 | 1040 | 116 | 6.76 |
| 80 | 6.08/9.02 | 1020 | 118 | 6.31 |
| 100 | 6.07/8.42 | 1020 | 118 | 6.12 |
| 120 | 6.04/8.38 | 1000 | 108 | 6.15 |

Figure 4:
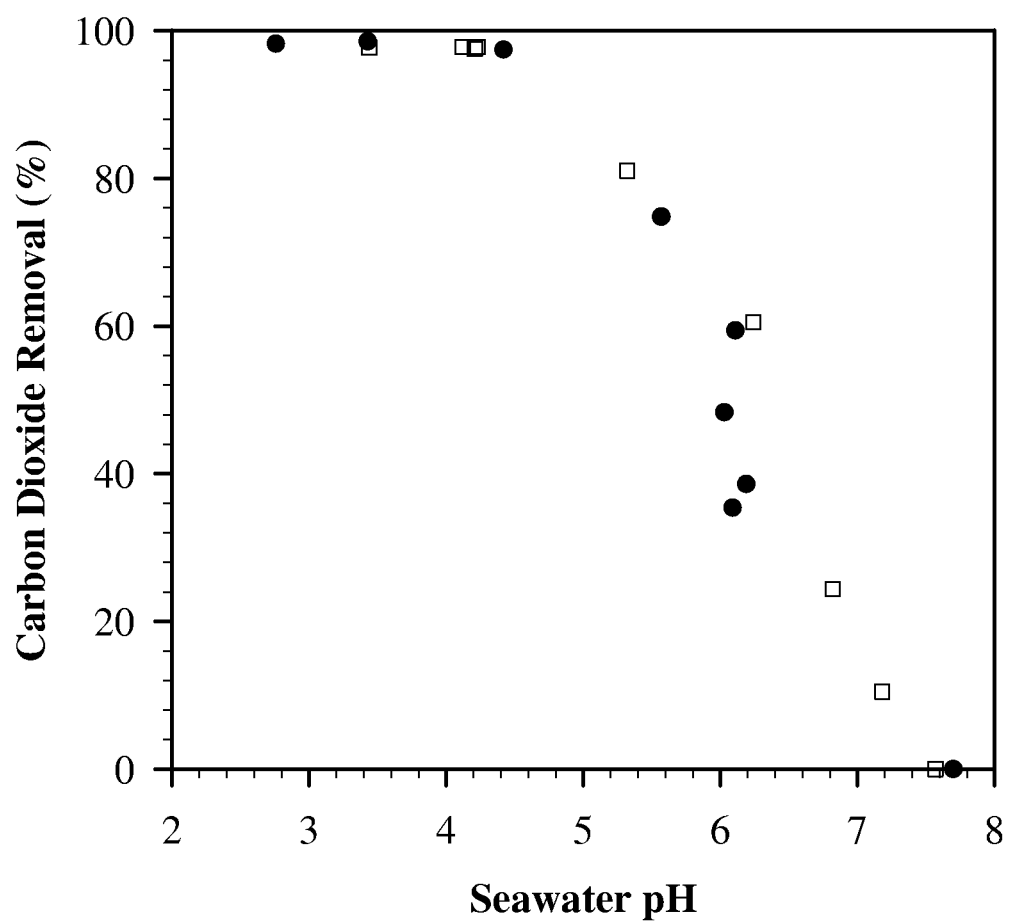
FIG. 4 shows carbon dioxide removal as a function of seawater pH for the $CO_2$ Degassed Samples of Example 7 (●) and Example 8 (□).
Figure 5:
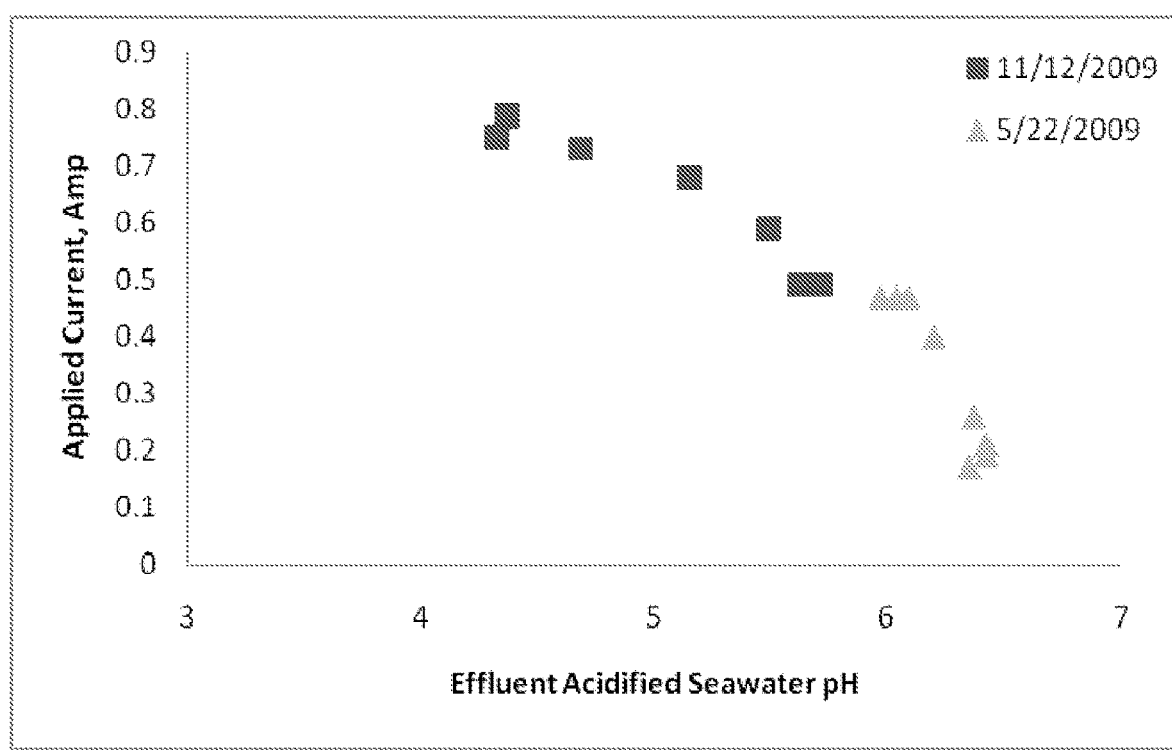
FIG. 5 is a graph of the effluent seawater pH as a function of applied current for treatment of Key West Seawater in Example 5 (May 22, 2009) and Example 10 (Nov. 12, 2009).

The pH of the effluent acidified seawater was measured for each of Examples 1-9. In Examples 7 and 8, the effluent acidified seawater was collected and 20 mL aliquots were placed in a 1000 mL round bottom flask and degassed using a Brinkmann Roto-Evaporator. A water aspirator provided a vacuum of approximately 15 mm Hg. The carbon dioxide content of each solution was measured by coulometry and plotted as a function of pH, as shown in FIG. 4. In both Example 7 and Example 8, greater than 98% carbon dioxide removal was achieved at pHs lower than 4.5. $CO_2$ dissolved in water is in equilibrium with $H_2CO_3$. The hydration equilibrium constant ($1.70 \times 10^{-3}$) indicates that $H_2CO_3$ is not stable and gaseous $CO_2$ readily dissociates at pH of 4.5, allowing $CO_2$ to be easily removed by degassing. This was observed during all of the foregoing examples.

$CO_2$ in seawater samples of pH of less than 4.5 was naturally and completely degassed upon exiting the acidification cell (exposed to atmosphere during sampling). $CO_2$ content and pH were measured before and after vacuum degassing and there was no significant difference in these two measurements.

$CO_2$ in seawater samples having a pH greater than 4.5, required assistance by vacuum degassing for complete $CO_2$ removal. In these samples, $CO_2$ content and pH were measured before and after vacuum degassing and there were significant differences in both measurements; $CO_2$ content decreased and pH increased. Although not quantified, it appeared that the degree of vacuum degassing required to completely remove the $CO_2$ increased as seawater pH increased.

Example 10

Example 10 was conducted to confirm the results of acidification of KW seawater obtained in Example 5. The process was also scaled up by five times to determine if the process can be linearly scaled up.

The acidification process of Example 5 was continued and operated for an additional 105 minutes in this Example 10.

TABLE 12

Results from Example 10

| Time, min | Amp/Volt | Influent Seawater Flow Rate, mL min$^{-1}$ | Influent DI Flow Rate, mL min$^{-1}$ | Effluent Acidified Seawater pH |
|---|---|---|---|---|
| 15 | 0.49/4.61 | 140 | 10 | 5.62 |
| 30 | 0.49/4.62 | 140 | 10 | 5.71 |
| 45 | 0.59/4.99 | 140 | 10 | 5.49 |
| 60 | 0.68/5.39 | 140 | 10 | 5.15 |
| 75 | 0.79/5.77 | 140 | 10 | 4.37 |
| 90 | 0.73/5.53 | 140 | 10 | 4.68 |
| 105 | 0.75/5.66 | 140 | 10 | 4.32 |

The results of Example 10 (Nov. 12, 2009) were consistent with the results of Example 5 (May 22, 2009), while keeping all variables and operating conditions identical.

Example 11—Process Scale Up

A theoretical flow rate to current ratio was used to evaluate the experimental results. In Example 5 KW seawater had a ratio of 298 with the Nalco™ module (140 mL/min required 0.47 amps to lower the pH to below 6.00). This ratio will be used to determine if the process can be scaled up in a linear fashion.

The dimensions of the IX compartment were 0.050 m×0.301 m×0.120 m, giving an area of 0.015 m$^2$ and a volume of 0.001 m$^3$. The Nalco™ module was operated at 140 mL/min or 0.037 gpm, giving the following two ratios:
Flow Rate to Area Ratio (gpm/m$^2$)=2.4
Flow Rate to Volume Ratio (gpm/m$^3$)=201

Example 11 was conducted at a higher flow rate to demonstrate that the scale up is linear. The same Nalco™ module was operated at five times more flow rate (700, mL/min) using KW seawater. The flow rate to current ratio was 298 (700 mL/min required 2.35 amps to lower the pH to 5.34). The two flow rate ratios were:
Flow Rate to Area Ratio (gpm/m$^2$)=12.0
Flow Rate to Volume Ratio (gpm/m$^3$)=1004

A large increase in flow rate to volume ratio did not affect performance indicating that this ratio may be further increased. This provides a great benefit since a marginal increase in module size will accommodate a significant increase in flow rate. However, increasing flow rate will increase pressure drop through the IX compartment. The particle size of the inert media can be increased from, for example, 20 to 40 mesh (0.41 to 0.76 mm) to 7 to 14 mesh (1.52 to 2.79 mm) in order to reduce the pressure drop.

Hardness Scaling

Hardness contained in seawater includes calcium ($Ca^{+2}$) and magnesium ($Mg^{+2}$) ions, and their total ion concentration is typically less than 2,000 mg L$^{-1}$. Hardness ions can migrate from the ion exchange (IX) compartment to the cathode compartment and can be introduced into the cathode compartment by the water feeding the cathode compartment. In the foregoing examples, deionized water was used as the feed water to the cathode compartment, so the only hardness ions entering the cathode compartment were from the IX compartment. It was initially assumed that the likelihood of hardness ions migrating from the IX compartment to the cathode compartment was negligible for the following three reasons:

The amount of cations that need to be exchanged to lower the pH is less than 0.5% of the total cations present in the seawater.

The molar ratio of Na$^+$ to hardness ions (Ca$^{2+}$ and Mg$^{2+}$) is approximately 7 to 1.

The mobility coefficient favors Na$^+$ (50.1 cm$^2$Ω$^{-1}$ eq$^{-1}$) over ½Ca$^{2+}$ (59.5 cm$^2$Ω$^{-1}$ eq$^{-1}$) and ½Mg$^{2+}$ (53.0 cm$^2$Ω$^{-1}$ eq$^{-1}$).

Figure 6:
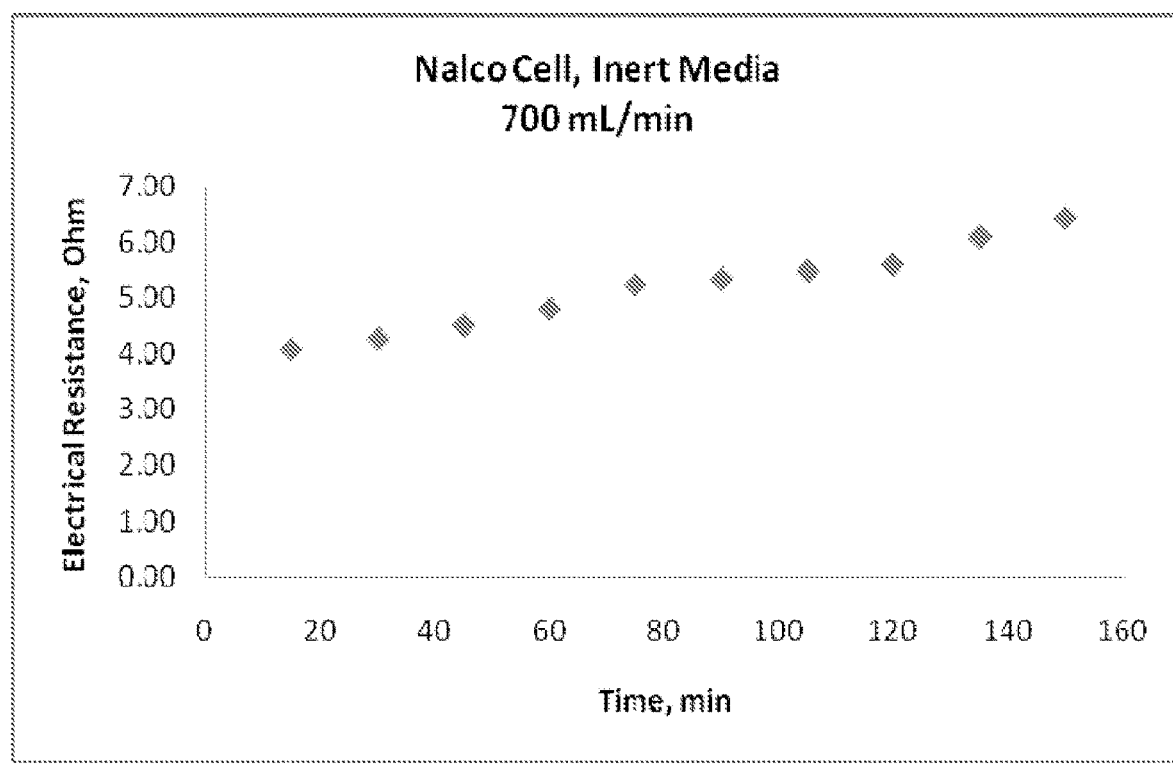
FIG. 6 is a graph of electrical resistance as a function of time showing the effect of scaling in the cathode compartment.

However, the actual results indicated that there was an effect as shown in FIG. 6.

FIG. 6 is a plot of electrical resistance (voltage divide by amperage) versus time. The signs of scaling are visible as a progressive increase in the electrical resistance over time. There was a 58.5% increase in electrical resistance (from 4.07 to 6.45 Ohms) after 150 minutes of operation. Reversing the polarity of the electrodes every 15 to 20 minutes can reduce fouling. This change in polarity causes scale and organics to disassociate from the electrode surface. The flow will also have to switch during every polarity reversal. This can be accomplished using solenoid valves that are synchronized to the polarity reversal. This is a common feature that is used in the Electrodialysis Reversal (EDR) process to desalinate brackish water.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for treating seawater, comprising:
   an anode compartment including an anode;
   a cathode compartment including a cathode;
   a central compartment, wherein the central compartment contains either no material or only inert media, and wherein the central compartment is between the anode and cathode compartments;

cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a power supply for applying current to the cathode and anode to create the driving force for an ion exchange substitution reaction where sodium ions are exchanged for hydrogen ions in the central compartment using an electrically driven membrane process, wherein the power supply for applying current is capable of reversing the polarity of the anode and the cathode to regenerate the apparatus;
a dihydrogen gas outlet in the cathode compartment;
a dihydrogen gas exit stream exiting the dihydrogen gas outlet; and
an applied current from the power supply controlling a molar ratio of dihydrogen gas in the dihydrogen gas exit stream to carbon dioxide simultaneously generated in the central compartment.

2. An apparatus for treating seawater, comprising:
an anode compartment including an anode;
a cathode compartment including a cathode;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a power supply for applying current to the cathode and anode to create the driving force for an ion exchange substitution reaction where sodium ions are exchanged for hydrogen ions in the central compartment using an electrically driven membrane process;
a dihydrogen gas outlet in the cathode compartment;
a dihydrogen gas exit stream exiting the dihydrogen gas outlet;
an applied current from the power supply controlling a molar ratio of dihydrogen gas in the dihydrogen gas exit stream to carbon dioxide simultaneously generated in the central compartment; and
a device for separating carbon dioxide from an effluent from the central compartment.

3. An apparatus for treating seawater, comprising:
an anode compartment including an anode;
a cathode compartment including a cathode;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a power supply for applying current to the cathode and anode to create the driving force for an ion exchange substitution reaction where sodium ions are exchanged for hydrogen ions in the central compartment using an electrically driven membrane process;
a dihydrogen gas outlet in the cathode compartment;
a dihydrogen gas exit stream exiting the dihydrogen gas outlet;
an applied current from the power supply controlling a molar ratio of dihydrogen gas in the dihydrogen gas exit stream to carbon dioxide simultaneously generated in the central compartment; and
a device for separating dihydrogen gas from an effluent from the cathode compartment.

4. An apparatus for treating seawater, comprising:
an anode compartment including an anode;
a cathode compartment including a cathode;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a power supply for applying current to the cathode and anode to create the driving force for an ion exchange substitution reaction where sodium ions are exchanged for hydrogen ions in the central compartment using an electrically driven membrane process;
a dihydrogen gas outlet in the cathode compartment;
a dihydrogen gas exit stream exiting the dihydrogen gas outlet;
an applied current from the power supply controlling a molar ratio of dihydrogen gas in the dihydrogen gas exit stream to carbon dioxide simultaneously generated in the central compartment; and
a device for producing hydrocarbons from the carbon dioxide extracted from the central compartment and the dihydrogen gas extracted from the cathode compartment.

5. An apparatus for treating seawater, comprising:
an anode compartment including an anode and cation exchange resin;
a cathode compartment including a cathode and cation exchange resin;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a dihydrogen gas outlet in the cathode compartment;
a dihydrogen gas exit stream exiting the dihydrogen gas outlet;
a power supply for applying current to the cathode and anode to create the driving force for an ion exchange substitution reaction where sodium ions are exchanged for hydrogen ions in the central compartment using an electrically driven membrane process, wherein the power supply for applying current is capable of reversing the polarity of the anode and the cathode to regenerate the apparatus; and
an applied current control to provide a molar ratio of dihydrogen gas in the dihydrogen gas exit stream to carbon dioxide simultaneously generated in the central compartment.

6. An apparatus for treating seawater, comprising:
an anode compartment including an anode and cation exchange resin;
a cathode compartment including a cathode and cation exchange resin;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a dihydrogen gas outlet in the cathode compartment;
a dihydrogen gas exit stream exiting the dihydrogen gas outlet;
a power supply for applying current to the cathode and anode to create the driving force for an ion exchange substitution reaction where sodium ions are exchanged for hydrogen ions in the central compartment using an electrically driven membrane process;
an applied current control to provide a molar ratio of dihydrogen gas in the dihydrogen gas exit stream to carbon dioxide simultaneously generated in the central compartment; and
a device for separating carbon dioxide from an effluent from the central compartment.

7. An apparatus for treating seawater, comprising:
an anode compartment including an anode and cation exchange resin;
a cathode compartment including a cathode and cation exchange resin;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a dihydrogen gas outlet in the cathode compartment;
a dihydrogen gas exit stream exiting the dihydrogen gas outlet;
a power supply for applying current to the cathode and anode to create the driving force for an ion exchange substitution reaction where sodium ions are exchanged for hydrogen ions in the central compartment using an electrically driven membrane process;
an applied current control to provide a molar ratio of dihydrogen gas in the dihydrogen gas exit stream to carbon dioxide simultaneously generated in the central compartment; and
a device for separating dihydrogen gas from an effluent from the cathode compartment.

8. An apparatus for treating seawater, comprising:
an anode compartment including an anode and cation exchange resin;
a cathode compartment including a cathode and cation exchange resin;
a central compartment, wherein the central compartment contains either no material or only inert media, and wherein the central compartment is between the anode and cathode compartments;
cation-permeable membranes separating the cathode and anode compartments from the central compartment;
a seawater inlet in the central compartment;
a continuous flow of seawater into the seawater inlet and through the central compartment, wherein carbon dioxide is generated in the central compartment when the flow of seawater is present;
an anode water inlet in the anode compartment, wherein hydrogen ions are generated in the anode compartment when water is present;
a cathode water inlet in the cathode compartment, wherein dihydrogen gas is generated in the cathode compartment when water is present;
a dihydrogen gas outlet in the cathode compartment;
a dihydrogen gas exit stream exiting the dihydrogen gas outlet;

a power supply for applying current to the cathode and anode to create the driving force for an ion exchange substitution reaction where sodium ions are exchanged for hydrogen ions in the central compartment using an electrically driven membrane process;

an applied current control to provide a molar ratio of dihydrogen gas in the dihydrogen gas exit stream to carbon dioxide simultaneously generated in the central compartment; and a device for producing hydrocarbons from the carbon dioxide extracted from the central compartment and the dihydrogen gas extracted from the cathode compartment.

* * * * *